Dec. 5, 1939.  R. H. DEAN  2,181,966
FASTENING DEVICE
Filed July 8, 1937

Inventor
Roy H. Dean
By Blackmore, Spencer & Flint
Attorneys

Patented Dec. 5, 1939

2,181,966

UNITED STATES PATENT OFFICE 2,181,966

FASTENING DEVICE

Roy H. Dean, Detroit, Mich., assignor to General Motors Corporation, Detroit, Mich., a corporation of Delaware Application July 8, 1937, Serial No. 152,485

2 Claims. (Cl. 85—5)

This invention relates to fastening devices of the type which are adapted to secure a part to a supporting member, the fastening device being connected to the part and having portions which expand or spring outwardly after they are inserted through an aperture formed in the supporting member.

Since the thickness of the supporting member or the dimensions or shape of the fastening device or the part to which it is connected may vary, one of the objects of this invention is to so construct the fastening device that it will be adapted to compensate for these differences, and therefore will serve to hold the part securely against the supporting member regardless of these variations.

Another object of the invention is to provide a fastening device wherein the portions which pass through the aperture and thereafter expand outwardly are so constructed that they are free to move in the direction in which they expand without causing movement of other portions of the fastening device, such as the portions which serve to connect the fastening device to the part it is intended to secure in place.

Other objects and advantages will be apparent upon referring to the following description and accompanying drawing, in which Fig. 1 is a transverse sectional view through a supporting member and a part which is secured thereto by the use of my improved fastening device.

Figure 1:
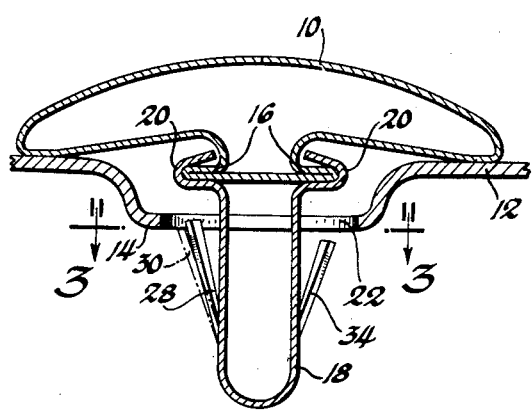
Figure 2:
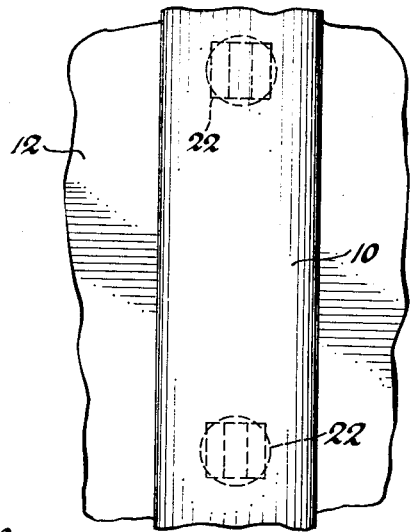
Fig. 2 is a plan view of the structure shown in Fig. 1.

Referring to Figs. 1 to 4, the reference numeral 10 indicates a part, which in the embodiment illustrated is shown as being a molding, which is to be secured to a supporting member 12, which is shown as having, but which does not necessarily have to have in order to carry out the invention, a depressed portion 14. Formed on the underside of the molding is a portion having laterally extending flanges 16 which extend the full length of the molding.

My improved fastening device, which is formed of flat spring metal, has a U-shaped body portion 18, the ends of which are bent outwardly and thence inwardly and upwardly to form gripping portions 20 which are adapted to embrace the flanges 16 on the molding, the metal of the fastening device being sufficiently resilient that the gripping portions may be sprung apart to permit sliding the fastening device along the molding until the desired position is reached, whereupon the fastening device is released and the gripping portions contract tightly against the opposite edges of the flanges 16 and thereby serve to hold the fastening device firmly in place.

Figure 3:
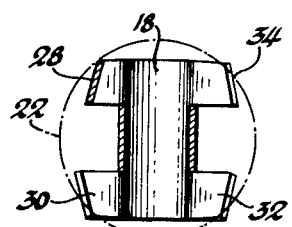
Fig. 3 is a sectional view taken on the line 3—3 of Fig. 1.
Figure 4:
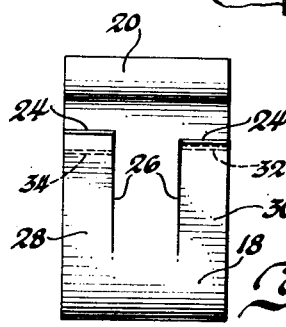
Fig. 4 is a side elevational view of the fastening device shown in Fig. 1.

Apertures 22 are formed at intervals through the depressed portion of the supporting member 12, and the body portions of the fastening devices are adapted to be inserted into these apertures. To hold the fastening devices in place in the apertures, the metal of the body portion of the fastening device is sheared inwardly from the edges as indicated at 24 in Fig. 4 and then downwardly as at 26, to form holding portions 28, 30, 32 and 34 which are bent outwardly as shown in Fig. 1, and which are twisted slightly so that they extend at an angle with respect to the body portion, as shown in Fig. 3.

Since the fastening device is made of spring metal, it will be seen that as it is inserted into the aperture 22, the holding portions will be pressed inwardly until they are through the aperture, after which they spring outwardly to their original position, their ends engaging the under or inner side of the supporting member and thereby holding the fastening device in place in the aperture. It will be noted that each of the holding portions 28, 30, 32 and 34 is formed of a different length, the top of the holding portion 28 being the closest to the top of the fastening device, and the top of the holding portion 34 being the furthest from the top of the fastening device, the others being in between.

This is done to compensate for variations in the dimensions or shape of the supporting member or the part which is to be attached thereto. It will be seen that as the fastening device is inserted into the aperture, the holding portion 34 will be the first to pass through the aperture and to spring outwardly, 32 will be the next and so on. If it so happens that the size or shape of the supporting member or part to be secured thereto is such that the fastening member cannot be pressed into the aperture far enough for the longest holding portion 28 to pass through and to expand outwardly, one of the shorter holding portions will have passed through and will have sprung outwardly so that its end will be adapted to engage the back of the supporting member to hold the fastening device in place in the aperture.

Since there are four holding portions of different lengths, it will be obvious that there are four different positions to which the fastening device may be moved in the aperture, and will be firmly held in place in any one of these positions. It will of course be understood that if desired more or less of the holding portions may be formed on the fastening device, each being of a different length from the others, so that there will be as many different positions in which the fastening device may be secured in place in the aperture as there are holding portions.

Another advantage of the fastening device disclosed is that since the holding members which are sheared from the body portion of the fastening device are the only portions of the device which are pressed inwardly during insertion of the device or which spring outwardly thereafter, the relation of the gripping portions 20 to the flanges 16 of the molding is not disturbed. This is important particularly when the fastening devices have been assembled in predetermined position on the molding at spaced intervals so that they will register with the spaced apertures 22 in the supporting member. Obviously if the gripping action of the portions 20 on the flanges 16 were lessened during the act of inserting the fastening devices into the apertures, it would be possible for the position of the fastening devices on the molding to change so that they would no longer come opposite the apertures.

Figures 5, 7:
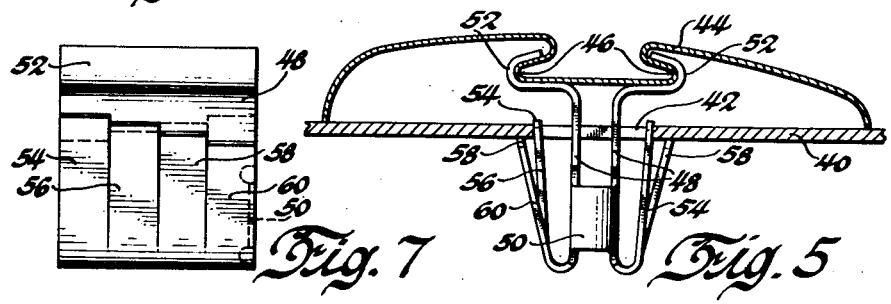
Fig. 5 is a view similar to Fig. 1 but showing a different form of fastening device embodying my invention.
Fig. 7 is a side elevational view of the form of fastening device shown in Fig. 5.
Figure 6:
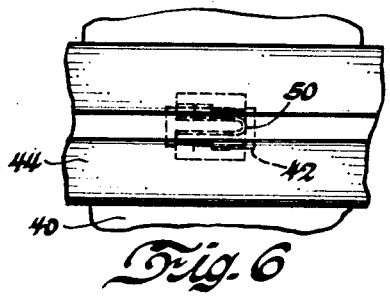
Fig. 6 is a plan view of the structure shown in Fig. 5.

In Figs. 5 to 7 there is illustrated a slightly different structure embodying my invention. Here the numeral 40 indicates the supporting member which has spaced apertures 42 formed through it, and 44 is the part which is to be attached thereto, the central portion of the part 44 being shown as being bent downwardly and then outwardly to form flanges 46. In the form of fastening device disclosed in Fig. 5, the two sides of the body portion 48 are joined together at one side thereof by means of a U-shaped strip 50, and gripping portions 52 adapted to embrace the flanges 46 are provided at the upper ends of the two sides of the body portion.

The holding portions in this form of fastening device are formed by bending outwardly and upwardly the lower ends of the two sides of the body portion, and these upwardly bent portions are split or sheared, as shown in Fig. 7, to form holding portions 54, 56, 58 and 60 which while joined together at their lower ends, are free to move independently of each other throughout their length. These holding portions are made of different lengths, the one indicated by the numeral 54 being the longest, 60 being the shortest, with the others being in between in length, and as is the case with the form shown in Fig. 1, when the fastening device is inserted into the aperture 42, as soon as the shortest holding portion 60 passes through, it springs outwardly to serve to hold the fastening device in place in the aperture. If the proportions of the parts are such that the fastening device may be pressed into the aperture still further, then the next longest holding portion 58 will pass through and spring outwardly, and so on until the fastening device has been pressed into the aperture as far as it can go.

It will thus be seen that due to the presence of a number of holding portions of different lengths on the fastening device, the latter will be firmly held in any one of a number of different positions in the aperture, thereby taking care of variations in the dimensions or shape of the parts. It will likewise be seen that as with the form shown in Fig. 1, the fastening device disclosed in Fig. 5 is so constructed that the holding portions are free to move without disturbing the position of the gripping portions 52.

While I have disclosed specific forms of my improved fastening device, it will be understood that various changes in size, shape and details of construction may be made without departing from the spirit and scope of the appended claims.

I claim:

1. A fastening device having a pair of leg portions, and a plurality of holding portions sheared from each of said leg portions, said holding portions being of lengths different from each other, the holding portions on each of the legs being free to flex with respect to the legs independently of each other.

2. A fastening device having a pair of leg portions, gripping portions formed on said leg portions, and a plurality of holding portions of lengths different from each other formed on each of said leg portions, said holding portions being free to move inwardly or outwardly with respect to the leg portions without causing movement of the gripping portions.

ROY H. DEAN.